United States Patent

Rideout, Jr.

[11] 4,388,805
[45] Jun. 21, 1983

[54] POWER PLANTS DERIVING THEIR ENERGY FROM EXPANSION AND CONTRACTION

[76] Inventor: Merle C. Rideout, Jr., 1 Roberts La., Cape Elizabeth, Me. 04107

[21] Appl. No.: 226,915

[22] Filed: Jan. 21, 1981

[51] Int. Cl.³ .............................................. F03G 7/06
[52] U.S. Cl. ...................................... 60/527; 60/516
[58] Field of Search ................ 60/527, 528, 529, 530, 60/659, 516

[56] References Cited

U.S. PATENT DOCUMENTS

| | | | |
|---|---|---|---|
| 576,830 | 2/1897 | Ulli | 60/530 X |
| 2,660,030 | 11/1953 | Santos | 60/530 |
| 2,755,619 | 7/1956 | Sheft | 60/530 |
| 3,142,149 | 7/1964 | Hays | 60/528 |
| 3,366,865 | 1/1968 | Shapiro | 60/529 X |
| 3,911,680 | 10/1975 | Blanchard | 60/529 |
| 4,055,956 | 11/1977 | Matovich, Jr. | 60/527 |

FOREIGN PATENT DOCUMENTS

| | | | |
|---|---|---|---|
| 2410152 | 7/1979 | France | 60/527 |
| 569744 | 9/1977 | U.S.S.R. | 60/529 |

*Primary Examiner*—Sheldon J. Richter

[57] ABSTRACT

A generator is operated by stored energy derived from an elongated unit providing expanding and contracting forces when subjected to a temperature cycle within a predetermined range. These forces are utilized to drive a rack which is in mesh with a pinion on a drive shaft connected to at least one generator drive of a type creating, storing, and releasing the stored energy.

19 Claims, 8 Drawing Figures

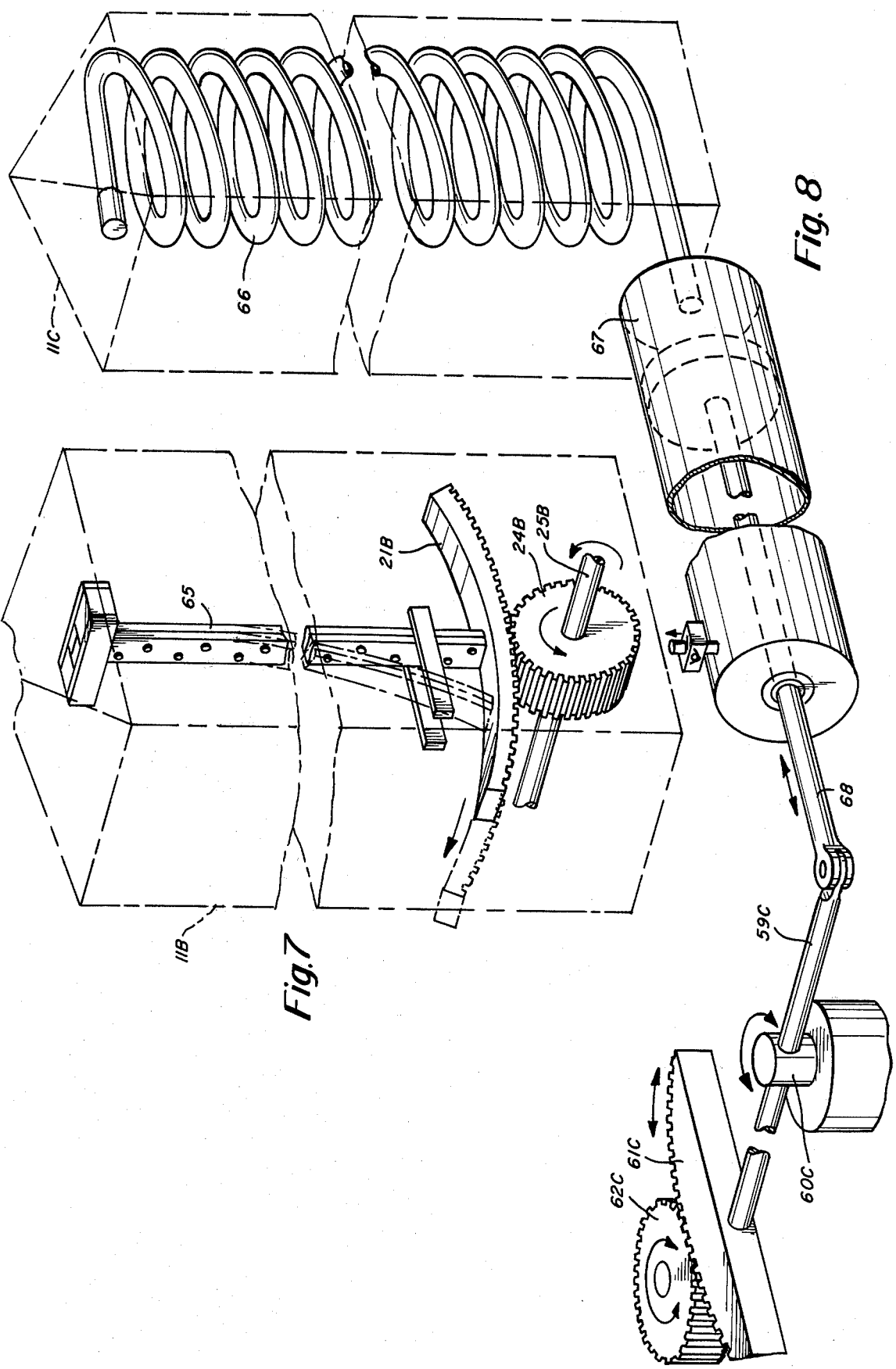

POWER PLANTS DERIVING THEIR ENERGY FROM EXPANSION AND CONTRACTION

BACKGROUND REFERENCES

U.S. Pat. No. 2,967,249
U.S. Pat. No. 3,630,020
U.S. Pat. No. 3,678,685
U.S. Pat. No. 3,777,876
U.S. Pat. No. 4,014,170

BACKGROUND OF THE INVENTION

The linear of expansion of various materials is well known and has long been used to provide bimetallic members that, as the ambient thermal conditions vary to which they are exposed, so expand and contract as to do useful work in various thermostatic devices.

In addition, the cited background references disclose the use of thermally responsive devices for use in rotating shafts, not only by means of bimetallic members but also by means of fluid expansion, see U.S. Pat. No. 4,014,170.

As the coefficient of expansion of liquids, gases, and solids is relatively small, the utilization of the forces attendant their expansion and contraction to do work such as the generation of electricity presents real problems even though such forces may be very substantial.

THE PRESENT INVENTION

The general objective of the present invention is to enable the forces attendant the expansion and contraction of various materials, occurring during a heating and cooling cycle within a predetermined temperature range, to be utilized to provide energy in a form that may be stored and used at a controlled rate to operate a generator.

In accordance with the invention, this objective is attained by utilizing such forces in units, each operable to drive a rack meshing with a pinion on a shaft with the unit operable to provide rack work strokes that are long relative to the coefficient of expansion of the substance or substances employed and with the shaft connected to at least one drive create and store energy which, when released, drives a generator.

In one embodiment of the invention, this objective is attained by utilizing a metal member of appropriate length and cross sectional dimensions that will have appreciable lengthwise movement as it expands and contracts when subjected to temperatures within a predetermined range, exert substantial forces and resist buckling in applying such forces in a manner such that the inherently short movements result in relatively long movements with the lessened force still adequate to perform the wanted work.

The metal member, in its simplest form, is straight but because of the length required to provide useable movements, it is also proposed to have the metal member in the form of a coil. In a typical embodiment of the invention, the expansion and contraction of the member is effected by ambient atmospheric temperatures supplemented by solar heating in any desired way. Standby heating and cooling systems may be used to ensure operation under all conditions or to modify the operating cycle. Waste or circulating cold and hot water systems may be used to establish the wanted temperature variations or to provide operating cycles other than that afforded by day and night temperature changes.

Each unit utilizing such an elongated metal member has the member pivotally connected to one end of a lever of substantial length having its fulcrum relatively close to that connection so that as the member expands and contracts, the arc through which the other lever end swings is so substantially increased that adequate working strokes are provided in both the expansion and contraction phases of the unit. While the rack may be otherwise driven by the lever, it is shown in embodiments illustrated by the drawings as arcuate and fixed on said other lever end.

In another embodiment of the invention, the unit is a long bimetallic member having one end fixed and a rack attached to its free end or otherwise driven thereby.

In yet another, the unit consists of a long tubular, fluid charged chamber, desirably in the form of a coil, in communication with a piston-cylinder unit which operates a lever by which a rack is driven.

In one embodiment of the invention, the mechanism driven by the shaft includes air compressing means delivering air under pressure into a tank from which it is used at a regulated rate to operate a turbine or other engine by which the generator is driven. The air compressing means is preferably a double-acting piston-cylinder unit driven by the shaft to have a plurality of strokes in either direction the shaft is rotated by a unit.

In another embodiment of the invention, first and second resilient means are provided, one to be compressed and the other free to release the energy stored therein as the shaft is turned first in one direction and then the other by a unit. The stored energy is released at a controlled rate to operate a generator through suitable gearing when the direction of shaft rotation is reversed. It is preferred that each resilient means is compressed by and in turn drives a rack in mesh with a pinion on a stub shaft connected to the drive shaft by a one way clutch when the drive shaft is turning in one direction and to the generator drive by a one way clutch, when the direction of rotation of the drive shaft reverses.

Another objective of the invention is to provide means by which the expansion-contraction cycle can be controlled. In one embodiment of the invention the unit is a coil within a tower providing a solar heated chamber in the daytime and equipped with louvers that can be opened at night so that the tower becomes a cooling chamber. Additional heating and cooling means may also be employed. In another embodiment of the invention, the unit may be heated, for one example, by water used in the cooling system of a nuclear powered plant and cooled by the water entrant of that system, or, for another example, by exhaust gases of a furnace and cooled by recirculated water sprays or heated by a burner using, for example, LPG gas.

Other objectives, novel features and advantages of the invention will be apparent from the drawings, the accompanying specification and the appended claims.

BRIEF DESCRIPTION OF THE DRAWINGS

The accompanying drawings illustrate preferred embodiments of the invention of which

FIG. 7 is a like view of a power plant in accordance with another embodiment of the invention in which an arcuate rack is driven by a bimetallic member; and FIG. 8 is another like view of yet another embodiment of the invention in which the rack is driven in one direction by fluid expansion.

THE PREFERRED EMBODIMENTS OF THE INVENTION

Figure 1:
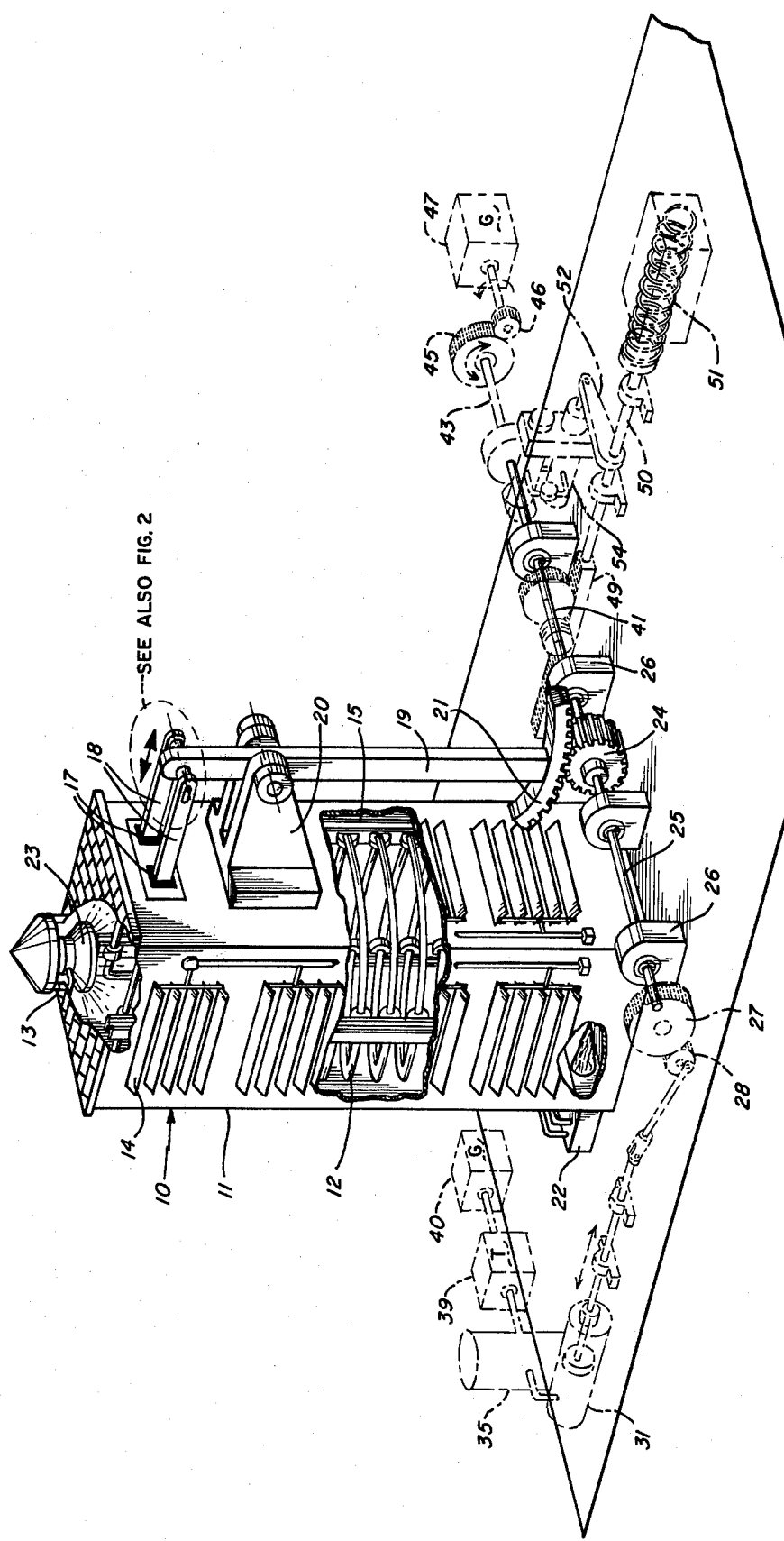
FIG. 1 is a somewhat schematic view of a power plant operating two different types of generator drives.
Figure 2:
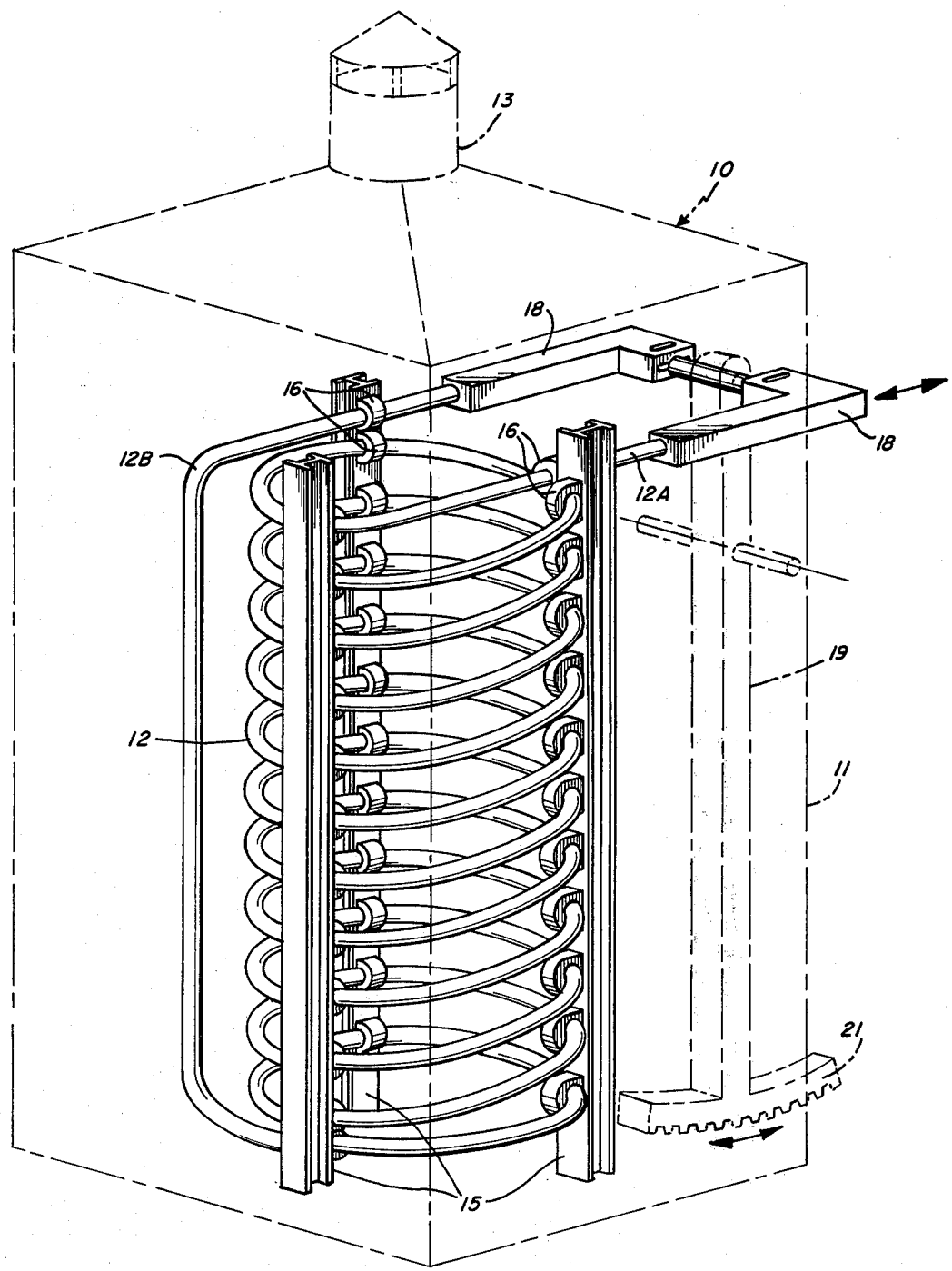
FIG. 2 is a similar view, on an increase in scale, of the power plant by itself.

The power plant, generally indicated at 10 in FIGS. 1 and 2 is to be primarily operated by ambient atmospheric temperatures on a day and night cycle and is shown as having a tower 11 of substantial height housing the metallic member 12 of substantial length and in the form of a coil. The tower has an exhaust port 13 in the roof and louvers 14 in its sides to be opened at night and closed during the day. The tower 11 is of a construction maximizing the solar heating of its interior during the day.

Within the tower 11 there are vertical and appropriately reinforced columns 15 spaced and arranged to confine the coil 12 and provided with grommets 16 slidably receiving and holding its turns. The upper coil end terminates in a horizontal portion 12A while a vertically disposed end portion 12B extends upwardly from the bottom turn of the coil and then horizontally parallel to the portions 12A. The end portions 12A and 12B extend outwardly through ports 17 adjacent to roof of the tower and are joined to the side arms of a U-shaped holder 18.

A lever 19 the length of which is shown as nearly equal to the height of the tower 11 is connected at its upper ends 18 of the portions 12A and 12B and is pivotally held by a mount 20 located relatively close to said upper end thereby to provide that the arcuate rack 21 fixed on the lower end of the lever 19 will swing through an arc that is substantial as the upper lever end is moved a short distance by the coil 12 as it expands and contracts.

The tower 11 is also provided, see FIG. 1, with a heater 22 supported by its base and a cooling water spray head 23 below the exhaust port 13 to enable the interior of the tower to be heated and the coil 12 cooled if day and night temperature changes are deemed inadequate or the cycle of operation is to be varied.

Figure 3:
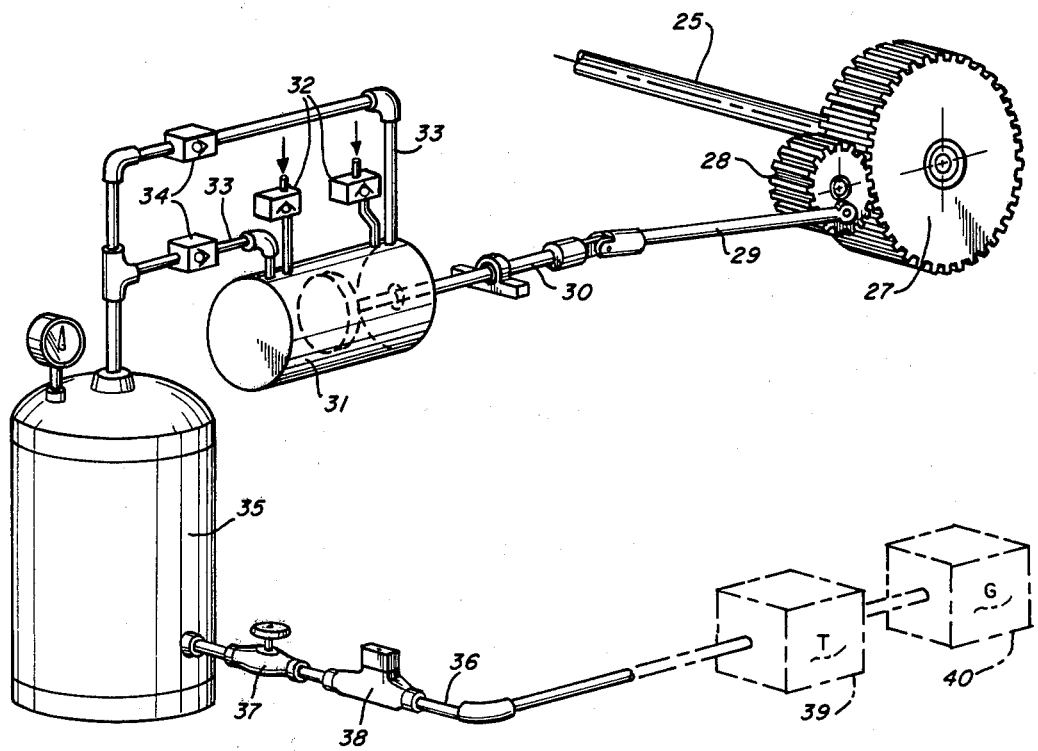
FIG. 3 is a somewhat schematic view of the left hand generator drive of FIG. 1.

The arcuate rack 21, see FIGS. 1 and 3, meshes with a pinion 24 on a transverse shaft 25 journalled in bearings held in supports 26. The shaft 25, see FIGS. 1 and 3, is shown driving a gear train schematically illustrated by the large gear 27 fast on one end of the shaft 25 and in mesh with a small gear 28 shown as provided with a connecting rod 29 pivotally joined to the end of the piston rod 30 of the piston-cylinder unit generally indicated at 31. The cylinder of the unit 31 has valve controlled intake ports 32 at each end and interconnecting outlet conduits 33 at each end, each provided with a check valve 34 and in communication with a compressed air tank 35. A conduit 36 provided with a regulating valve 37 and a check valve 38 is connected to the indicated turbine or other engine 39 by which the generator 40 is driven.

The gear train is desirably such that several air compressing strokes of the piston of the unit 31 will attend the turning of the shaft as the rack 21 swings in either direction from one limit of travel to the other. In addition, the capacity of the tank 35 is preferably such as to enable the generator to be continuously operated.

Figure 4:
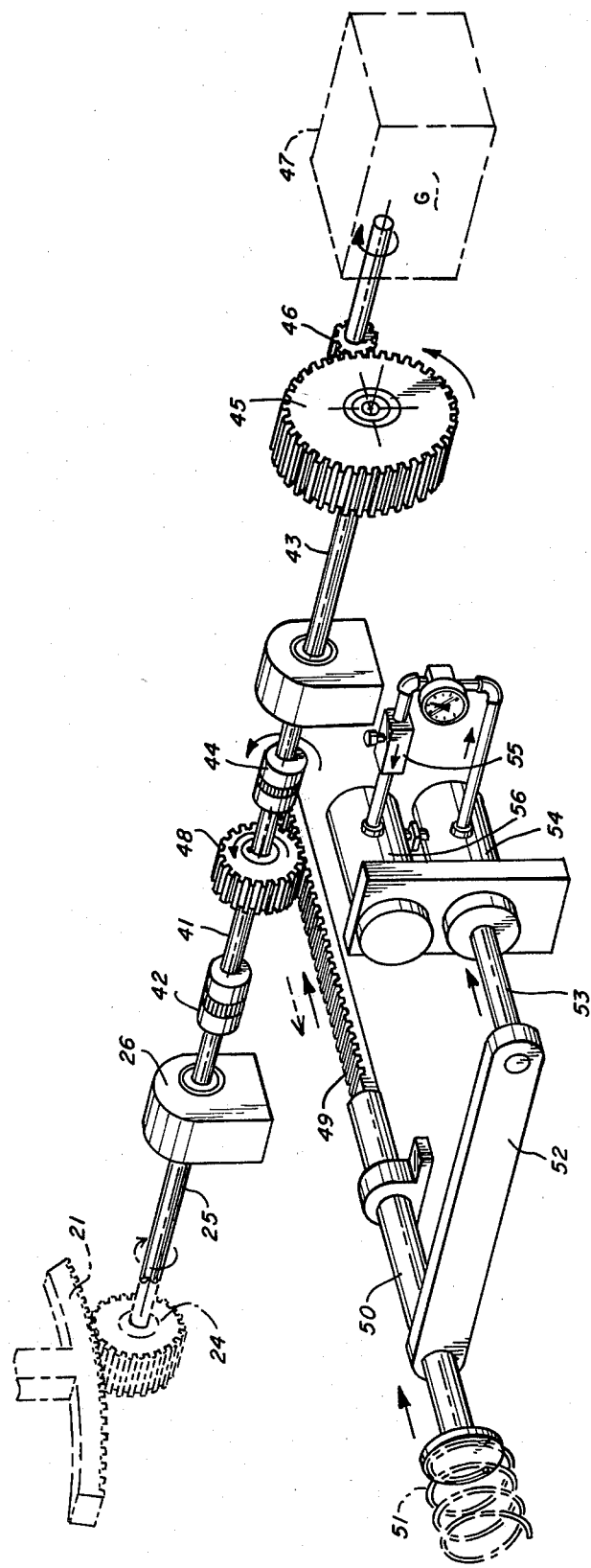
FIG. 4 is a like view of the right hand drive of FIG. 1.

The other end of the shaft 25, see FIG. 4, is connected to one end of a stub shaft 41 by a one way coupling 42 only when the shaft 25 is rotated in the direction indicated by the broken line arrow. The other end of the stub shaft 41 is connected to a shaft 43 by a one way coupling 44 only when the stub shaft is rotated in the opposite direction, indicated by the solid line arrows. A relatively large gear 45, fast on the shaft 43 is in mesh with a relatively small gear 46 fixed on the end of the drive shaft of the generator 47.

A pinion 48 fast on the stub shaft 41 is in mesh with a slidable rack 49 having a headed end section 50 in engagement with a spring unit 51 which is compressed to store energy when the stub shaft 41 is connected to and rotated by the shaft 25 and which releases the stored energy when torque is no longer applied by the shaft 25 then to rotate the stub shaft 41 in a direction to drive the generator.

In order that the energy stored in the spring unit 51 is released at a controlled rate, the headed rack section 50 is provided with a side arm 52 to the outer end of which the rod 53 of a piston-cylinder unit 54 is connected, the rod 53 parallel to the rack 49. Liquid in the unit 54, when the rack 49 is driven by the spring unit 51, is forced through an adjustable throttle valve 55 into a tank 56 from which liquid is withdrawn when the rack 49 is again driven by the shaft 25.

Figure 5:
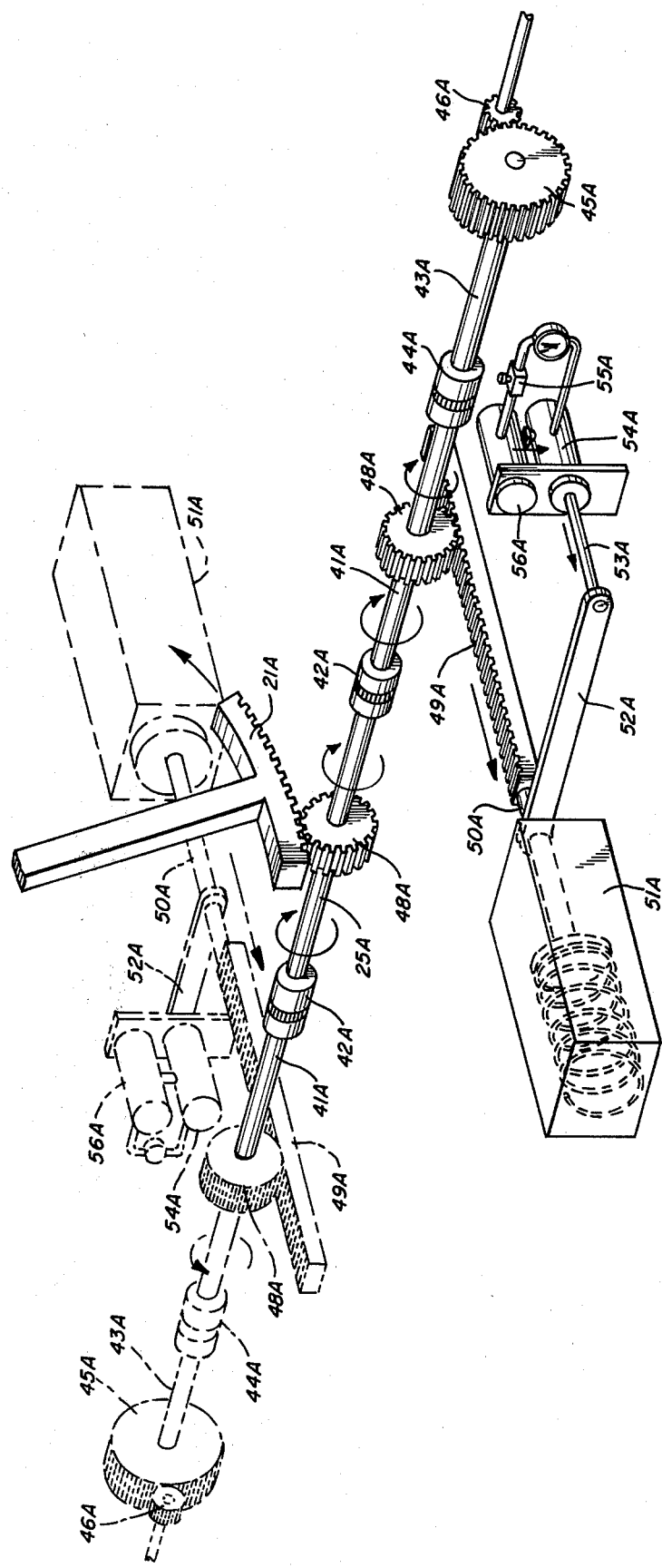
FIG. 5 is a schematic showing of the use of two drives of the type illustrated by FIG. 4 with both driven by the same power plant.

In the embodiment of the invention illustrated by FIG. 5, two drives of the type illustrated by FIG. 4 are operated by the same power plant to effect the storage of energy by one while the other is disconnected therefrom. As both units are shown as identical to the drive of FIG. 4, neither is detailed and corresponding parts are identified by the appropriate reference numerals distinguished by the suffix addition A.

In FIG. 5, the right hand drive is shown in solid lines and as the shaft 25A is turning in the direction indicated by the associated solid line arrow, the stub shaft 41A of that drive is connected thereto and the rack 49 driven in the direction in which the spring unit 51 is compressed.

The left hand drive, shown in broken lines, is now disconnected from the shaft 25A and is represented as releasing energy by the broken line arrows.

Figure 6:
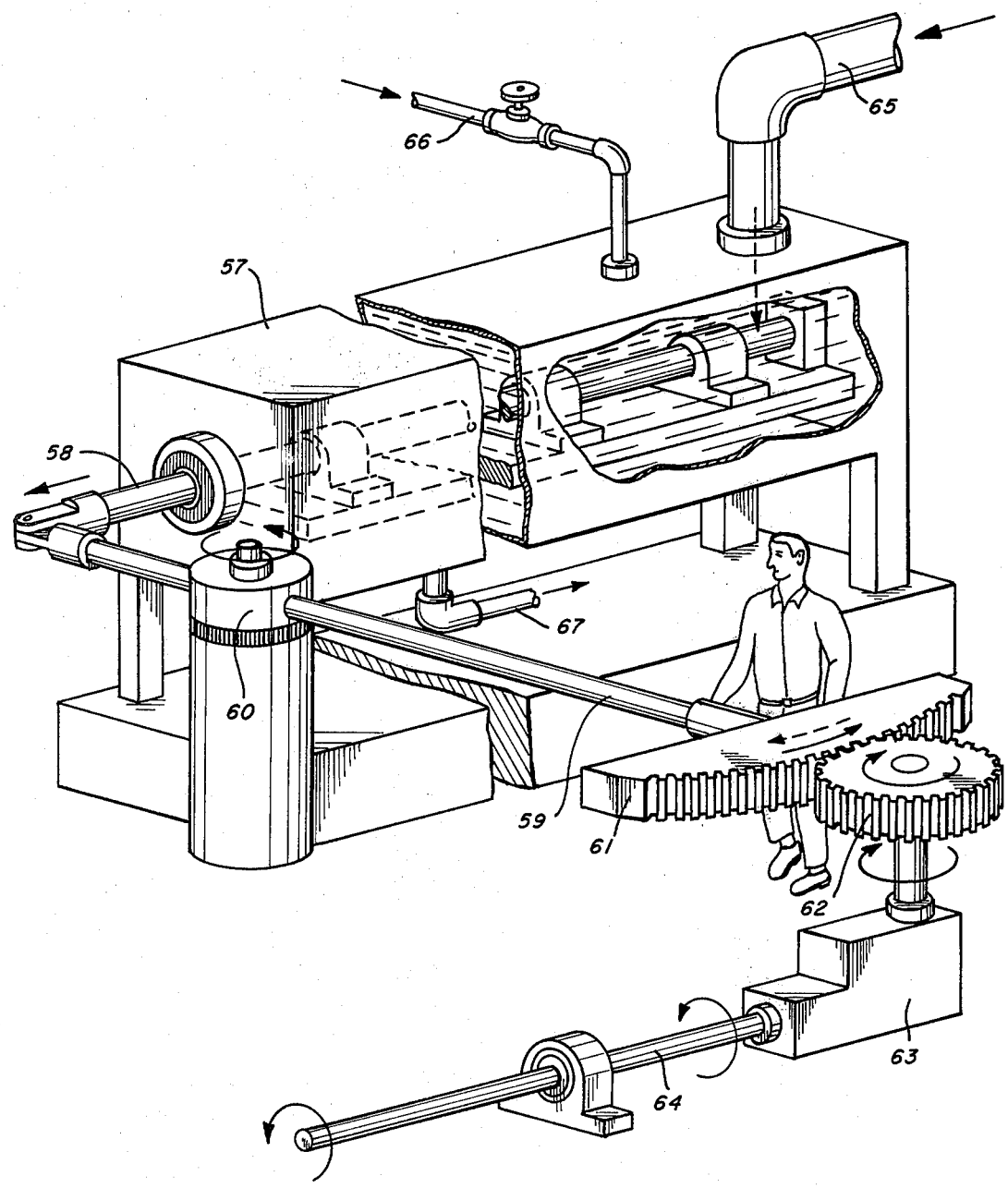
FIG. 6 is a schematic view of a power plant in accordance with another embodiment of the invention.

In the embodiment of the invention illustrated by FIG. 6, the power plant includes a closed tank 57 of substantial length in which a straight metal member 58 is slidably mounted and shown as having one end fixed adjacent one end of the tank and of a length such that it extends through and is sealed in the opposite end wall. The outer end of the member 58 is pivotally connected to the short end of a long lever 59 pivotally mounted as at 60 and provided with an arcuate rack 61 in mesh with a gear 62 on the drive shaft of a speed-increasing gear box 63 the driven shaft 64 of which is or may be the drive shaft of a generator, not shown, for one example.

The tank 57 has a supply line 65 for hot water which may be waste hot water, a line 66 for cold water, and an outlet 67 thereby enabling the member 58 to be subjected to expanding and contracting temperatures within a suitable range.

The embodiment of the invention illustrated by FIG. 7 has a tower desirably identical to that shown in more detail and described in connection with FIGS. 1 and 2 and, accordingly, is identified by the reference numeral 11B. The tower 11B houses a depending bimetallic member 65 of substantial length with an arcuate rack 21B connected to its free end and in mesh with a pinion 24B on the shaft 25B by which the drives described in connection with FIGS. 3-5 may be operated by way of examples and not of limitation.

The embodiment of the invention illustrated by FIG. 8 has a like tower 11C enabling a coil 66 of tubular stock, supported therein, to be subjected to changing temperatures within an adequate range. The coil 66 is charged with a gas or liquid having a suitable coefficient of expansion and the coil opens into the cylinder of a piston-cylinder unit 67 the cross sectional area of which is substantially greater than that of the coil tubing. The piston rod 68 of the unit 67 is shown as employed to operate a drive like that illustrated by FIG. 6, with the corresponding parts of which that are shown identified by the appropriate reference numerals distinguished by the suffix addition C. The cylinder of the unit 67 has an air port ensuring reversal.

From the foregoing, it will be appreciated that power plants provide means enabling the relatively short and slow reciprocation attendant thermal expansion of solids and fluids to be effectively employed.

I claim:

1. A power plant including means operable to generate electricity, first means operable first to create and store energy and then to release energy to said generating means to effect operation thereof and second means operable first to create and store energy and then to release energy to said generating means to effect the operation thereof, means including a unit that expands and contracts to a predetermined extent when subjected to a temperature cycle within a predetermined range and during both expansion and contraction provides work strokes of predetermined maximum length, and means connecting said unit to said first and second storage means in a manner such that a work stroke in one direction operates said first storage means to create and store energy and said second storage means to release stored energy and a work stroke in the other direction operates said second storage means to create and store energy and said first storage means to release stored energy.

2. The power plant of claim 1 in which the connecting means includes a drive shaft provided with a pinion, a rack connected to the unit in a manner such that the rack has work strokes greater than the work strokes of the unit.

3. The power plant of claim 2 in which the unit is a bimetallic member one end of which is fixed and the rack is fixed on the free end thereof.

4. The power plant of claim 2 in which the unit includes an elongated member operable to expand and contract when subjected to a temperature cycle within a predetermined range, structure so supporting and confining said unit that such expansion and contraction is relative to at least one end thereof, a lever to one end of which said one end of the unit is connected, the arcuate rack is fixed on the other end of said lever, and pivot means connect said lever to said structure and located between the ends of the lever in a position to cause said other lever end to swing through an arc that is greater than the arc through which said one lever end swings during such expansion and contraction.

5. The power plant of claim 1 in which said generating means is turbine driven and the first and second means include air compressing means operated by the shaft, and storage means receiving and storing compressed air and delivering compressed air to said turbine at a controlled rate to effect the operation thereof.

6. The power plant of claim 5 in which said air compressing means is operable in either direction the shaft rotates.

7. The power plant of claim 6 in which the air compressing means is a piston cylinder unit including valve controlled air intake ports and discharge conduits arranged to effect the delivery of air to said storage means during piston travel in either direction.

8. The power plant of claim 7 in which said air compressing means includes a drive connected to and operated by said shaft to effect a plurality of piston strokes during the swinging of said lever from one extreme position to the other.

9. The power plant of claim 1 in which the connecting means includes at least one rack, means connecting said rack to the shaft to be driven thereby only when the shaft is turning in one direction, resilient means compressed by said rack when driven by the shaft, a drive connected to the generating means, means connecting said drive to said rack only when the shaft is turning in the other direction, and means to regulate the rate at which the rack is moved under the influence of the resilient means.

10. The power plant of claim 9 in which the rate regulating means includes a piston-cylinder unit, the piston of which is connected to the rack to be moved thereby through a wanted maximum stroke, and the cylinder of said unit has a fluid inlet provided with a check valve open only when said rack is driven by said shaft and an outlet including a throttle valve operable to restrict the discharge of fluid from said cylinder when said rack is driven by said resilient means.

11. The power plant of claim 10 and a fluid storage tank with which the inlet and the outlet of the cylinder are in communication.

12. The power plant of claim 9 in which the gear is between the ends of the shaft, there are two racks, one on each side of the gear, means connecting one rack to the shaft only when said shaft is turning in one direction, means connecting the other rack to the shaft only when said shaft is turning in the opposite direction, two resilient means, one for each rack and compressed thereby when the rack is driven, means connecting each rack to said shaft when turning in the appropriate direction, a generator drive for each resilient means, means connecting each rack to the appropriate drive when the shaft is turning in a direction in which that rack is disconnected therefrom, and means to regulate the rate at which each rack moves under the influence of the associated resilient means.

13. The power plant of claim 12 in which there are two generators, one for each generator drive.

14. The power plant of claim 9 in which the shaft includes a coaxial end section, means connecting the end section to the shaft when turning in the appropriate direction, said end section includes a pinion in mesh with the rack, and the drive for the generating means includes a coaxial shaft, means connecting the coaxial shaft to the appropriate end section when that end section is driven by the associated resilient means.

15. The power plant of claim 1 in which the unit is an elongated member is in the form of a vertical coil, the power plant includes a heat absorbing tower housing said coil, a series of columns within the tower surround the coil and are provided with grommets slidably confining turns of the coil, the lever is pivotally connected to the tower and extends vertically with respect thereto, at least the upper turn of the coil includes an end portion connected to the upper end of the lever, said tower also including louvers movable between open and closed positions to permit the flow through the tower of outside air.

16. The power plant of claim 15 in which the tower includes a spray unit above the coil and auxiliary heating means below the coil.

17. The power plant of claim 4 in which the fourth means includes a tank and the unit is an elongated member extending through the tank with said end connected to the lever and means to deliver in the alternative first a hot liquid and then a cold liquid into said tank.

18. The power plant of claim 1 in which the unit includes a coil of tubular stock, a piston-cylinder unit the piston of which is connected to said lever, said coil closed at one end and the other end opening into the cylinder of the piston-cylinder unit, said cylinder charged with a fluid that expands and contracts to a predetermined extent to provide a predetermined maximum forward piston travel, and said cylinder having an air inlet located beyond the forward position of the piston operable to exert piston return force when said fluid contracts.

19. The power plant of claim 18 in which the inside diameter of the cylinder is substantially greater than that of the tubular stock.

* * * * *